April 13, 1965   Z. FOX ETAL   3,178,207
UNIVERSAL TUBE JOINT WITH BEARING INSERTS
Filed June 17, 1960   2 Sheets-Sheet 1

INVENTORS
ZOLA FOX
EDWIN EIGER
WILLIAM S. HOSEK
By William R. Wright
his AGENT

April 13, 1965  Z. FOX ETAL  3,178,207
UNIVERSAL TUBE JOINT WITH BEARING INSERTS
Filed June 17, 1960  2 Sheets-Sheet 2

INVENTORS
ZOLA FOX
EDWIN EIGER
WILLIAM S. HOSEK
BY
his AGENT 3,178,207
UNIVERSAL TUBE JOINT WITH BEARING
INSERTS
Zola Fox, Verona, N.J., Edwin Eiger, Spring Valley, N.Y., and William S. Hosek, Mount Tabor, N.J., assignors to Thiokol Chemical Corporation, Bristol, Pa., a corporation of Delaware
Filed June 17, 1960, Ser. No. 36,813
1 Claim. (Cl. 285—165)

This invention relates generally to joints and couplings and more particularly to a tubular universal joint capable of containing fluid under pressure despite conditions of misalignment of adjacent conduit sections.

Joints of this general type are known in the art but as a whole are characterized by certain inherent disadvantages. Among these are a complicated structure involving many parts rendering installation difficult and resulting in unnecessary expense; the need to use multiple packing glands and screw couplings for effective sealing; the occurrence of excessive wear of relatively movable sections; an inability to maintain sealing capability while the sections are experiencing relative motion and inability to relieve strains particularly when there is a misalignment between the connected conduits.

Accordingly, the main object of the present invention is to provide an improved tubular joint which will obviate the disadvantages characterizing known structures.

An important object of the present invention is to provide an improved tubular universal joint capable of containing fluid under pressure while its ends are subjected to conditions of angular misalignment, axial and lateral displacement, and/or relative longitudinal rotation about a main axis.

Another important object of the present invention is to provide an improved tubular universal joint having a minimum number of parts of novel construction and cooperative relationship with each other.

A further important object of the present invention is to provide an improved tubular universal joint which may be readily connected to and disconnected from tubular conduits, which will be susceptible of ready and economical manufacture, and which will be rugged and of long life in use.

Other objects and advantages of the invention will become apparent during the course of the following description.

In the drawings, we have shown two embodiments of the invention. In these showings:

Figure 1:
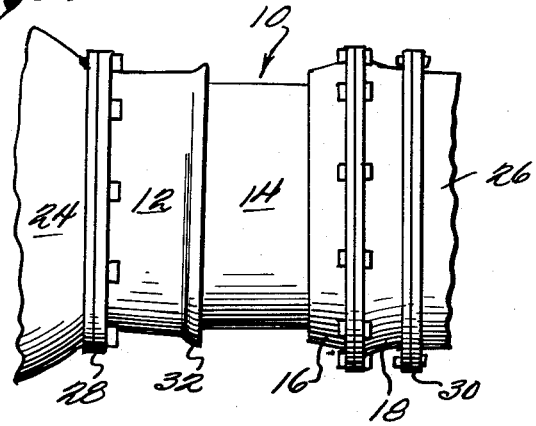
FIGURE 1 is a side elevational view of the tubular universal joint comprising the present invention showing it coupled to the ends of a pair of fixed, tubular conduits.

Referring to the drawings, numeral 10 designates as a whole, the tubular universal joint of the present invention which comprises a tubular end piece 12, a spacer tube or sleeve hereinafter referred to as the spacer tube 14, a pair of retaining clamps 16, 18, and two O-rings or seals 20 and 22.

The tubular joint 10 is adapted to be connected to a pair of fixed tubular conduits 24 and 26 as by bolt receiving flanges 28 and 30 formed respectively on the left end of the end piece 12 and on the right end of the outer retaining clamp 18.

Figure 4:
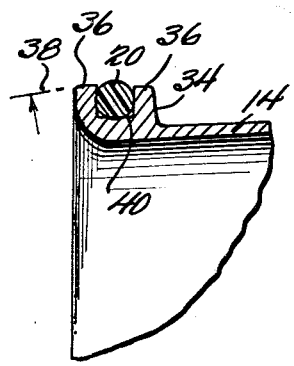
FIGURE 4 is a fragmentary sectional view of the left end of the sleeve or spacer tube showing a seal mounted in one of its spherical surfaces.

The tubular end piece 12 which terminates at its right end in a bell portion 32, slidably receives the left end of the spacer tube 14 upon which an outwardly directed flange 34 is formed. The peripheral surface 36 of the flange is spherically machined in an arc 38 whose center coincides with that of the spaced tube 14 (FIGURE 4), and includes a recess 40 for the reception of the sealing element or O-ring 20. An elongated portion 42 of the right end of the spacer tube 14 is flanged and its outer surface 43 is also spherically machined in an arc about the tube center.

The retaining clamps 16 and 18 whose inner surfaces are spherically machined to conform with the surface 43 are flanged as at 44 and 46 respectively for connection together by suitable means such as bolts, the flanges being so shaped as to form an inner peripheral recess 48 for the reception of the sealing element or O-ring 22. It is to be noted that the axial dimension of the recess diminishes as the flanges move into abutting relationship to compress the O-ring against the spherical surface 43. Provision is also made in the retaining clamps for incorporation of material 45 and 47 which is capable of acting in a load bearing or supporting capacity. The presence of bearings or bearing inserts 45 and 47 present a marked decrease in frictional resistance to movement of spacer tube in any of its several modes of motion, though primarily effective during rotation about a central tube axis.

Figure 2:
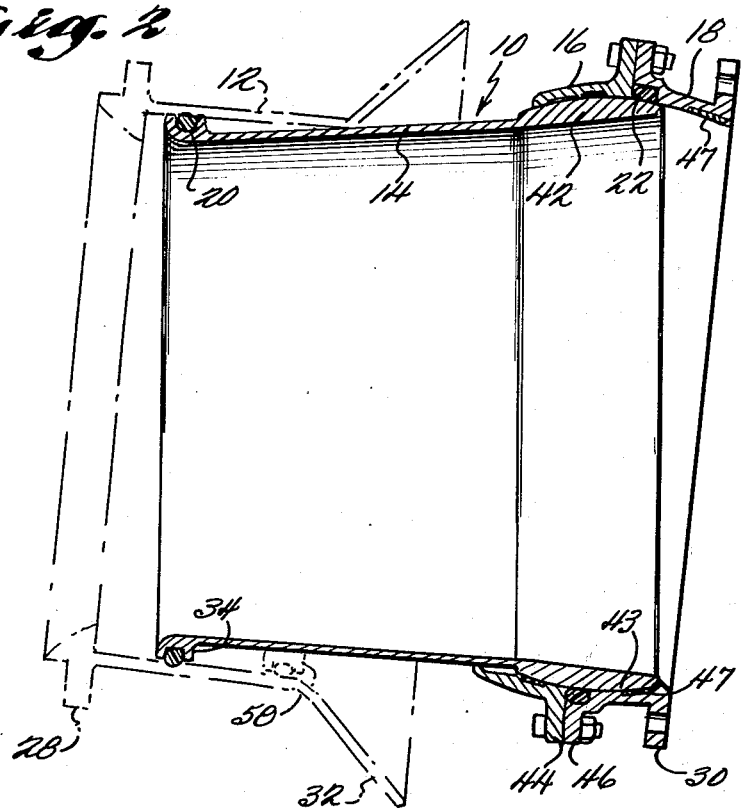
FIGURE 2 is a central longitudinal sectional view of the invention shown to an enlarged scale, parts being shown in elevation.
Figure 3:
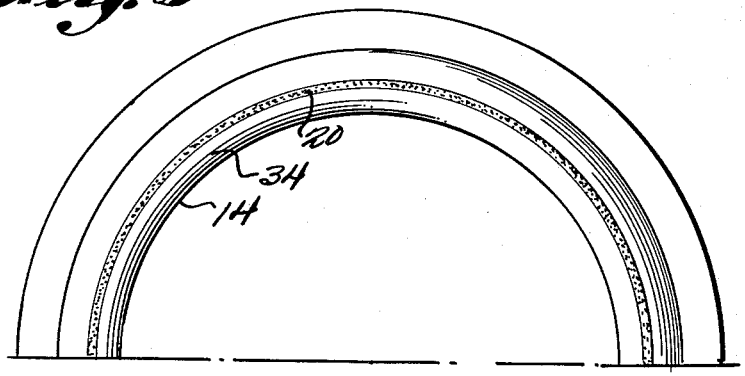
FIGURE 3 is an end elevational view thereof looking from the left in FIGURE 2 and with the flanged tubular end piece removed.

The joint 10 is connected to the ends of the fixed conduits 24 and 26 which may be angularly misaligned and laterally displaced, by first bolting the tubular end piece 12 to the end of the conduit 24. The retaining clamp 16 containing bearing insert 45 is placed on the spacer tube 14 from the left end thereof. Seal or O-ring 22 is installed in the retaining clamp 18 which may have been previously fitted with a second bearing or bearing insert 47. The retaining clamp 18 is then bolted to clamp 16 which causes distortion by compression of O-ring 22 in the recess 48 formed by the retaining clamps. O-ring or seal 20 may now be inserted in recess 40 if convenient or at any time prior to placement of retaining clamp 16 over the spacer tube. The assembled parts are then inserted into the tubular end piece 12 as shown in FIGURE 2, distorting the seal 20 by placing it under compression. The clamp 18 is now aligned and moved into engagement with and bolted to the flange at the left end of the conduit 26.

It will now be apparent that the O-rings 20, 22 provide adequate sealing between the spherical surfaces 36 and 43 and their mating surfaces 12 and 16, 18 respectively, although other sealing arrangements such as lip and labyrinth seals and other types of packings can be used as will be apparent to one skilled in the art. It will be noted that the clamps 16, 18 positively retain the spacer tube 14 at all times and thus enables the ready engagement and disengagement of the joint connection.

Relative axial displacement of the connected conduits 24, 26 is accommodated in that the flange 34 of the spacer tube 14 may move within the end piece 12 from a point adjacent the flange 28 to the dotted line position 58 (FIGURE 2) or to the beginning of the bell section 32. Angular misalignment and lateral displacement is readily accommodated by the spherical flanges 34, 42 formed at the ends of the spacer tube 14. It will be appreciated that the degree of such accommodation increases as the flange 34 moves toward the dotted line position 58, this being enabled by the bell portion 32. The arrangement of this invention additionally permits rotational movement of the coupling relative to the conduits 24, 26, and is facilitated by the anti-frictional characteristics of bearings 45 and 47 which may be constructed of any suitable material consistent with the fluid flowing through the universal joint 10.

Figure 5:
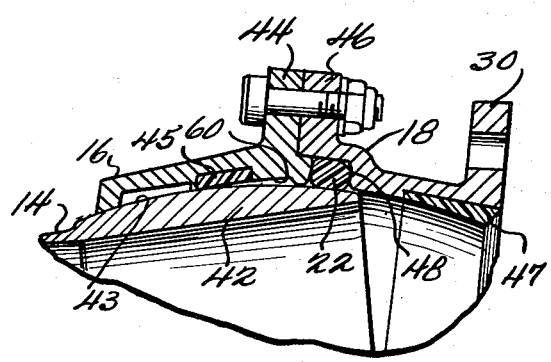
FIGURE 5 is a fragmentary sectional view of the right end of the spacer tube or sleeve and a modified form of the inner retaining clamp.

The modification of the invention disclosed in FIGURE 5 is to take care of situations where differences in the sealing diameters of the seals 20 and 22 exist. In such case, the thrust surface of the appropriate retaining clamp 16 or 18 is machined with a conical rather than a spherical surface.

As shown in FIGURE 5, the difference in the diameters of the seals 20 and 22 is such as to cause a thrust load on the inner surface 60 of the retaining clamp 16 when the joint 10 is pressurized. Accordingly, the inner surface 60 is machined conically rather than spherically which allows the thrust to be resisted by full, peripheral line contact as opposed to high wear, unsymmetrical surface contact as would be the case under such thrust if the surface 60 were spherical.

It is to be understood that the forms of the invention herewith shown and described are to be taken as preferred examples of the same and that various changes in the shape, size and arrangement of parts may be resorted to without departing from the spirit of the invention or the scope of the subjoined claim.

We claim:

A tubular universal joint for connecting a pair of fluid pressure conduits comprising, in combination, a spacer tube terminating at its ends in outwardly directed peripheral flanges having spherical outer surfaces, one of said flanges being of larger diameter and length than the other, an annular clamp member having a conical inner surface including an annular load bearing insert mounted to provide full peripheral line bearing contact with the spherical surface of said larger flange and movable over the smaller flange into engagement with said larger flange, a second annular clamp member having a spherical inner surface conforming with a portion of the spherical surface of said larger flange and including flanges for connection to said first clamp member to retain it against said larger flange and for connection to one of the fluid pressure conduits, means connecting said clamp members, said clamp members being formed when in abutting relationship to cooperatively define an annular groove in their spherical faces, a seal mounted in said groove and having sealing engagement with the spherical surface of said larger flange, a portion of said spherical inner surface including a wear ring insert adapted to engage the surface of said larger flange upon misalignment of said conduits, a seal mounted in said smaller peripheral flange, and a tubular end piece including flanges for connection with the other of the fluid pressure conduits, said spacer tube having its smaller flanged end mounted in said end piece for axial movement throughout its length and said smaller flange and seal spacing the wall of said spacer tube from and having sealing engagement with the wall of said end piece to permit fluid tight relative angular movement therebetween.

References Cited by the Examiner

UNITED STATES PATENTS

| | | | |
|---|---|---|---|
| 300,332 | 6/84 | Schmidt | 285—261 |
| 396,908 | 1/89 | Wiseman | 285—165 |
| 420,220 | 1/90 | Amos | 285—224 |
| 855,739 | 6/07 | Wilcox | 285—271 |
| 1,057,939 | 4/13 | Cooper | 285—261 |
| 1,067,516 | 7/13 | Gleeson | 285—264 |
| 1,074,877 | 10/13 | Leighty | 285—165 |
| 1,255,577 | 2/18 | Berry | 285—266 |
| 1,780,693 | 11/30 | Yazel | 285—165 |
| 2,305,296 | 12/42 | Lanninger | 285—266 |
| 2,516,743 | 7/50 | Allin | 285—261 |

FOREIGN PATENTS 2,320   1/84   Great Britain.

THOMAS F. CALLAGHAN, *Primary Examiner.*

CARL W. TOMLIN, *Examiner.*